United States Patent [19]
Yamamoto et al.

[11] Patent Number: 5,297,649
[45] Date of Patent: Mar. 29, 1994

[54] APPARATUS FOR CONTROLLING OUTPUT FROM ENGINE ON CRAWLER TYPE TRACTOR

[76] Inventors: Shigeru Yamamoto, c/o Kabushiki Kaisha Komatsu Seisakusho, Osaka Works, 3-1-1, Ueno, Hirakata-shi Osaka 573; Hideki Yamada, 7E14-104, Otokoyama-Yutoku, Yawata-shi, Kyoto 614, both of Japan

[21] Appl. No.: 476,419

[22] PCT Filed: Aug. 23, 1989

[86] PCT No.: PCT/JP89/00862

§ 371 Date: Jun. 15, 1990

§ 102(e) Date: Jun. 15, 1990

[87] PCT Pub. No.: WO90/02257

PCT Pub. Date: Mar. 8, 1990

[30] Foreign Application Priority Data

Aug. 23, 1988 [JP] Japan .................. 63-208774

[51] Int. Cl.⁵ .................................. B60K 41/00
[52] U.S. Cl. .................... 180/197; 172/3; 364/424.07; 364/424.1; 364/426.03
[58] Field of Search .......... 180/345, 324, 197, 282; 364/424.01, 424.07, 424.03, 424.1, 426.02, 426.03, 431.01; 172/2, 3, 5

[56] References Cited

U.S. PATENT DOCUMENTS

| 880,061 | 2/1908 | Anderson | 172/3 |
| 4,344,499 | 8/1982 | van der Lely | 180/197 |
| 4,402,377 | 9/1983 | Brooks | 180/197 |
| 4,454,919 | 6/1984 | Arnold et al. | 172/3 |
| 4,626,040 | 12/1986 | Ogino | 180/197 |
| 4,807,132 | 2/1989 | Arai et al. | 364/424.1 |
| 4,933,857 | 6/1990 | Hashiguchi et al. | 180/197 |

FOREIGN PATENT DOCUMENTS

| 57-18424 | 1/1982 | Japan . |
| 58-123932 | 7/1983 | Japan . |
| 59-14526 | 1/1984 | Japan . |
| 61-105228 | 5/1986 | Japan . |
| 62-118038 | 5/1987 | Japan . |
| 63-4131 | 1/1988 | Japan . |

Primary Examiner—Margaret A. Focarino
Assistant Examiner—A. M. Boehler
Attorney, Agent, or Firm—Falk, Vestal & Fish

[57] ABSTRACT

At the time of starting movement as well as at the time when a crawler type tractor, e.g., a bulldozer for performing a dosing operation and a ripping operation is held in a three-point grounding state, an output from an engine (10) is automatically reduced further from a normal cut-off state, whereby an operator is not required to depress a deceleration pedal (13). Consequently, a burden to be borne by him can be reduced substantially.

3 Claims, 10 Drawing Sheets

APPARATUS FOR CONTROLLING OUTPUT FROM ENGINE ON CRAWLER TYPE TRACTOR

TECHNICAL FIELD

The present invention relates generally to a crawler type tractor, e.g., a bulldozer having a blade, a ripper or the like attached thereto to perform a bulldozing operation, a ripping operation or the like. More particularly, the present invention relates to an apparatus for controlling an output from an engine installed on the crawler type tractor wherein the engine output is automatically controlled in an optimum manner based on a shoe slip at the time of starting movement of the vehicle (crawler type track), at the time when the vehicle is held in a neutral state or at the time when the vehicle is held in a three-point grounding state.

BACKGROUND ART

Generally, a crawler type tractor, e.g., a bulldozer or the like vehicle runs such that an output from an engine installed on the vehicle is transmitted to sprockets via a power line comprising a torque converter, a speed changing unit, bevel gears, a steering clutch, a steering brake and a final speed reduction unit and thereby track shoes extending round the sprocket wheels are driven.

On the other hand, a target engine speed of the engine on the crawler type tractor is set to a predetermined value by a throttle lever. Once the target engine speed is set, an output torque generated by the engine is controlled to reach the target engine speed by controlling a quantity of fuel to be injected. Usually, the crawler type tractor is equipped with a deceleration pedal so that the engine output can be reduced to a value corresponding to an extent of depressing of the deceleration pedal which has been depressed by an operator.

Tractive power generated by the engine during running of the crawler type tractor is related to a shoe slip rate representative of shoe slip appearing between the track shoes and the ground surface. As the shoe slip increases, the tractive power increases correspondingly, until the shoe slip rate reaches a predetermined limit value. However, if the shoe slip rate exceeds the predetermined limit value, the track shoes are uselessly caused to slip with the result that an engine output from the engine on the crawler type tractor fails to be effectively utilized as a tractive power. This leads to not only loss of energy but also wear of the track shoes within a short period of time.

Hitherto, e.g., when shoe slip occurs due to increased load during a soil heaping operation with the use of a blade or during a ripping operation with the use of a ripper unit attached to the bulldozer, an operator senses an occurrence of shoe slip and depresses the deceleration pedal to reduce the engine output. At the same time, he actuates a working unit actuating lever to alleviate the engine load to lower the tractive power. In other words, a problem arising due to an occurrence of shoe slip has been heretofore eliminated by the aforementioned complicated actuations which require a highly trained skill.

However, since a controlling operation for adequately compensating the shoe slip by an operator's actuation has been performed by sensing of the shoe slip, depressing of the deceleration pedal with his foot and actuating of levers for working units with his hand, he feels complicated and moreover he is required to pay close attention to his actuations. In practice, since he reduces an output from the engine after an occurrence of shoe slip, it is unavoidable that the shoe slip lasts for a certain period of time. In addition, some operators often cause useless slip due to careless inattention. In this case, it may be impossible to completely prevent an occurrence of such shoe slip. Particularly, when the bulldozer collides against a hard rock-bed during a ripping operation, the result is that the rear part of a vehicle body is raised up without piercing of a ripper into the rock-bed so that the bulldozer is brought in a three-point grounding state wherein the vehicle body comes in contact with the ground surface at three points, two of them being located at the fore parts of both crawler belts and the other one being located at the foremost end of the ripper. Once the vehicle is held in the three-point grounding state, an apparent load is reduced and a vehicle speed increases in excess of a required one. Consequently, the ripper can be pierced into the rock-bed only with much difficulty or it cannot be pierced into the rock bed any more. In such case, it is impossible to release the bulldozer from the three-point grounding state, unless an operator depresses the deceleration pedal to reduce an output from the engine.

In addition, the vehicle has a low shoe slip rate and receives a small magnitude of load at the time of starting movement thereof. Thus, it is natural that a vehicle speed increases in excess of a required one, whereby the ripper is incorrectly pierced into the rock-bed during a ripping operation. Therefore, there arises a problem that a long period of time is required until the ripper is pierced into the rock bed by a predetermined depth. To eliminate this problem, an operator is required to depress the deceleration pedal to reduce a vehicle speed even at the time of starting movement of the vehicle. However, so as to allow the vehicle speed to be adequately raised up via a very low speed, a low speed and an intermediate speed, he should be trained to a considerably high level. This is because if he is an untrained operator, he will not be able to properly deal with the aforementioned malfunction and inconvenience.

In general, with such a crawler type tractor as described above, while a transmission is held in a neutral state, the engine is fully rotated, unless an operator depresses the deceleration pedal. For this reason, to save fuel cost, he is required to depress the deceleration pedal at every time when the vehicle starts its running, while the transmission is held in the neutral state. In a case where he depresses the deceleration pedal after starting movement of the vehicle or at the same time as the starting movement of the vehicle, the engine speed decreases immediately due to an inertia of the engine, resulting in quick starting movement of the vehicle being achieved. Thus, another problem is that correct actuation of the deceleration pedal is absolutely necessary, e.g., to perform a ripping operation at a certain fixed location.

The present invention has been made with the foregoing background in mind.

An object of the present invention is to provide an apparatus for controlling an output from an engine installed on a crawler type tractor wherein an operator is not required to actuate a deceleration pedal during a ripping operation and a three-point grounding state of the vehicle due to incapability of piercing of a ripper into a hard rock-bed.

Another object of the present invention is to provide an apparatus for controlling an output from an engine installed on a crawler type tractor wherein while a transmission is held in a neutral state, an engine speed is automatically reduced to a predetermined one to save fuel cost and prevent quick starting movement of the vehicle.

Another object of the present invention is to provide an apparatus for controlling an output from an engine installed on a crawler type tractor wherein the vehicle can continuously run for a certain operation at an acceptable shoe slip rate without necessity for actuating the deceleration pedal.

DISCLOSURE OF THE INVENTION

To accomplish the above objects, there is provided according to a first aspect of the present invention an apparatus for controlling an output from an engine installed on a crawler type tractor, wherein the apparatus comprises tractive power characteristics outputting means for outputting first tractive power characteristics having a high output part of the engine output cut therefrom and second tractive power characteristics for allowing the engine output to be reduced further from the first output characteristics by a predetermined value, starting movement state detecting means for detecting the state of starting movement of the crawler type tractor, means for selecting the second tractive power characteristics and reducing the engine output, when starting movement of the crawler type tractor is detected by the starting movement state detecting means, and means for gradually raising up the engine output from the second tractive power characteristics to the first tractive power characteristics within a preset period of time after the engine output is reduced.

Namely, according to the first aspect of the present invention, when the crawler type tractor starts its running, the engine output is once reduced and thereafter it is gradually restored to the original first tractive power characteristics within the preset period of time.

Therefore, excessive increasing of a vehicle speed immediately after starting movement of the vehicle can be suppressed without necessity for actuation of the deceleration pedal with an operator s foot, whereby a ripping operation as well as a bulldozing operation can be performed at a high efficiency.

According to a second aspect of the present invention, there is provided an apparatus for controlling an output from an engine installed on a crawler type tractor wherein the engine output is reduced in accordance with preset tractive power characteristics, wherein the apparatus comprises neutral state detecting means for detecting the neutral state of a transmission and means for automatically reducing the preset engine speed down to a preset engine speed, when the neutral state is detected by the neutral state detecting means.

Namely, according to the second aspect of the present invention, while the transmission is held in the neutral state, fuel cost can be reduced by automatically reducing the present engine speed down to a suitable one. In addition, rapid starting movement of the vehicle can be avoided and a ripping operation can effectively be performed at a fixed location.

Further, according to the third embodiment of the present invention, there is provided an apparatus for controlling an output from an engine installed on a crawler type vehicle, wherein the apparatus comprises tractive power characteristics outputting means for outputting first tractive power characteristics having a high output part of the engine output cut therefrom and second tractive power characteristics for allowing the second output to be reduced further from the first tractive power characteristics by a predetermined value, three-point grounding state detecting means for detecting the state of three-point grounding of the crawler type tractor and means for selecting the second tractive power characteristics and reducing the engine output, when the state of three-point grounding is detected by the three-point grounding means.

The three-point detecting means detects that the vehicle is held in the three-point grounding state, e.g., when it detects the number of times (the number of periods) wherein an amplitude of accelerated vibration of the vehicle continuously exceeds a preset value and the detected number of times exceeds a preset one.

Namely, according to the third aspect of the present invention, when it is detected that the vehicle is held in the three-point grounding state, the engine output is automatically reduced from the present level of engine output down to a predetermined value, whereby the three-point grounding state is eliminated. When it is detected that the three-point grounding state has been eliminated, the reduced engine output is restored to the original first tractive power characteristics.

Therefore, according to the third aspect of the present invention, the three-point grounding state can automatically be eliminated without necessity for actuating the deceleration pedal, whereby a load to be borne by an operator can be diminished.

BEST MODE FOR CARRYING OUT THE INVENTION

Now, the present invention will be described in detail hereinafter with reference to the accompanying drawings which illustrate an apparatus for controlling an output from an engine installed on a crawler type tractor. It should be noted that this embodiment is described on the assumption of a case where a bulldozer performs a ripping operation and a dosing operation.

Figure 1:
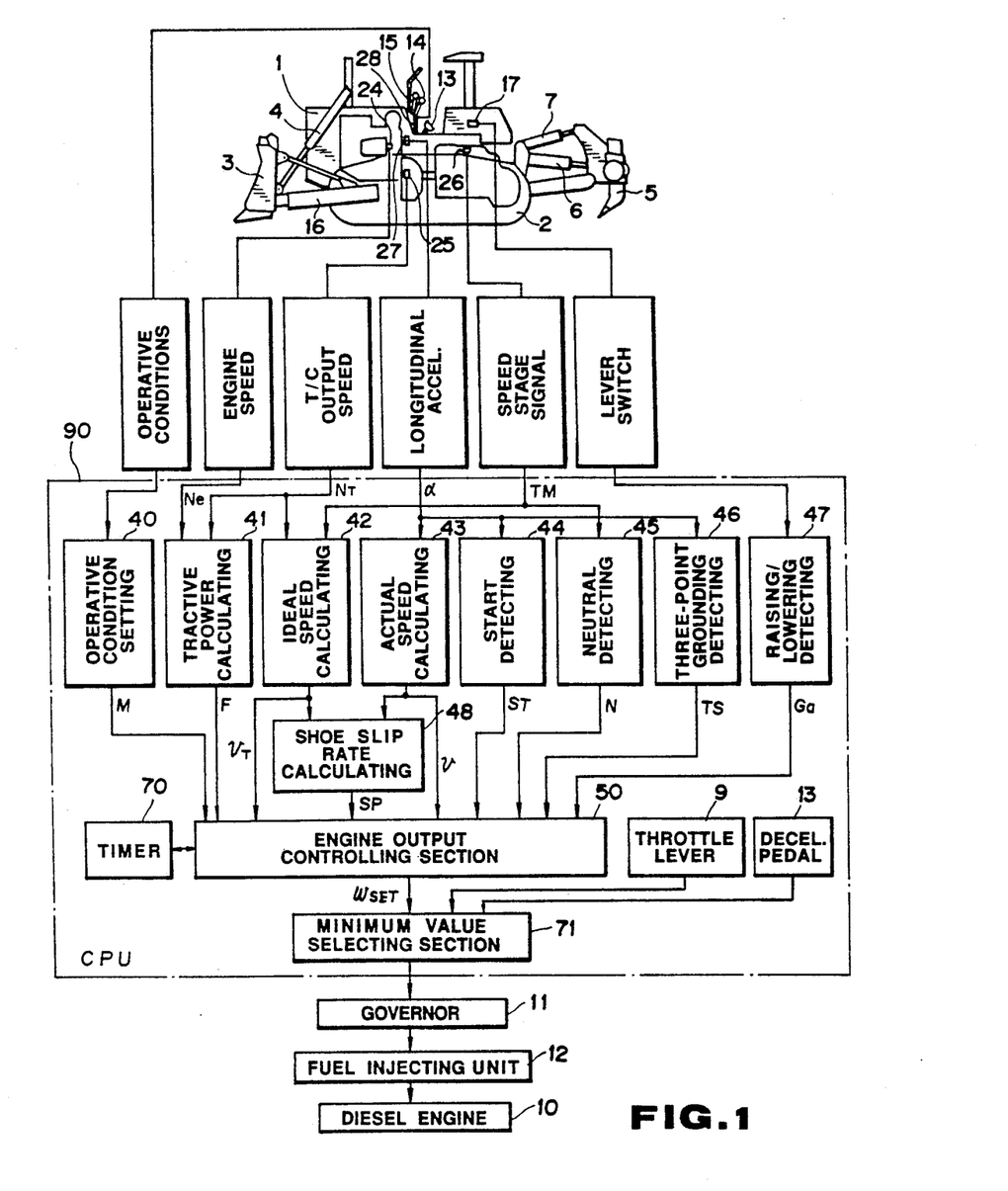
FIG. 1 is a block diagram which schematically illustrates an apparatus for controlling an output from an engine installed on a crawler type tractor in accordance with an embodiment of the present invention.

As shown in FIG. 1, the bulldozer is equipped with an opposing pair of crawler belts 2 on both sides of a vehicle body 1. Further, the bulldozer includes a blade 3 in front of the vehicle body 1, and the blade 3 rises and lowers in response to extension or contraction of a blade cylinder 4. In addition, the bulldozer includes a ripper shank 5 behind the vehicle body 1, and the ripper shank 5 rises and lowers in response to extension and contraction of a lift cylinder 6 and tilts in response to actuation of a tilt cylinder 7.

A throttle lever 9 is provided in the form of an actuation lever for setting a target engine speed for an engine 10. Once the target engine speed is set by the throttle lever 9, a central processing unit (hereinafter referred to as a CPU) 90 controls the engine 10 via a governor 11 and a fuel injection unit 12 such that the engine 10 generates a torque corresponding to the thus set target engine speed.

A deceleration pedal 13 is provided in the form of a foot pedal which is depressed by an operator to reduce the torque generated by the engine 10. When the pedal 13 is depressed by an operator's foot, a stroke quantity detecting sensor attached to the pedal 13 detects a quantity of stroke so that the torque generated by the engine 10 is reduced in proportion to the quantity of stroke.

A blade lever 15 is provided in the form of a manual actuating lever which carries out rising, lowering, angling and tilting of the blade 3. The blade cylinder 4 and a frame 16 are extended or contracted in response to actuation of the blade lever 15.

The levers 14 and 15 are provided with a working unit lever detecting sensor 17 for detecting the present position to which they are actuated, respectively.

Figure 2:
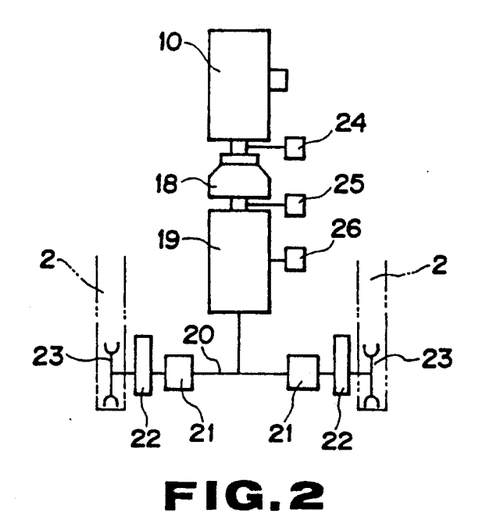
FIG. 2 is a schematic plan view which illustrates by way of example a driving power transmission mechanism for a bulldozer.

FIG. 2 is a schematic plan view of a power transmission mechanism for the bulldozer in FIG. 1 as seen from the above.

As is apparent from FIG. 2, an output from the engine 10 is transmitted to a driving shaft 20 via a torque converter 18 and a speed changing unit 19. Driving power derived from the driving shaft 20 is then transmitted to an opposing pair of steering clutch brakes 21, an opposing pair of final speed changing units 22 and an opposing pair of sprockets 23 each pair of which are arranged on opposite sides of the driving shaft 20. Each of the sprockets 23 meshes with the crawler belt 2. With such construction, the crawler belts 2 are driven with tractive force which varies with a total speed reduction ratio which is determined by components arranged within the range from input/output shafts of the speed changing unit 19 till the sprockets 23.

An output shaft of the engine 10 is provided with an engine speed sensor 24 for detecting the present engine speed and an output shaft of the torque converter 18 is provided with a torque converter output shaft rotation speed sensor 25 for detecting the present torque converter speed. In addition, the speed changing unit 19 is provided with a speed stage detecting sensor 26 (in the form of a clutch hydraulic pressure sensor) for detecting the presently selected speed stage.

Figure 3:
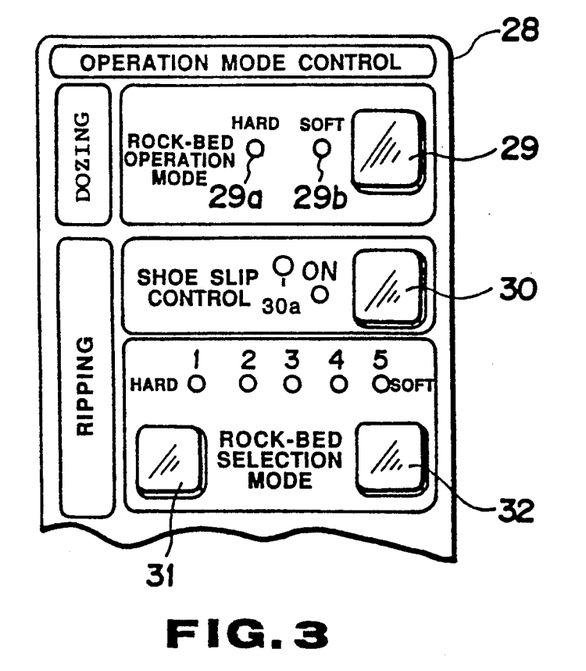
FIG. 3 is a fragmentary front view which shows part of an operation monitor panel for the apparatus.

Further, as shown in FIG. 1, the bulldozer is equipped with an acceleration sensor 27 for detecting acceleration in the longitudinal direction of the vehicle body 1. An operation monitor panel 28 is placed in front of an operator's seat so as to allow an operator to select operative conditions required for the bulldozer and display thereon monitor informations necessary for him. The operation monitor panel 28 includes an operation mode selection panel as shown in FIG. 3. The operation mode selection panel is provided with a rock-bed mode selection switch 29 for a dozing operation so as to allow him to select a soft rock-bed or a hard rock-bed when the switch 29 is shifted to ON. If he selects a hard mode, an LED 29a corresponding to the hard mode is illuminated, and if he selects a soft mode, another LED 29b corresponding to the soft mode is illuminated. The CPU 90 carries out optimum engine torque control corresponding to the selected mode.

The operation monitor panel 28 includes a slip control switch 30 and rock-bed selection switches 31 and 32 for a ripping operation. The slip control switch 30 is provided in the form of a switch which selectively determines whether an engine torque control (slip control) should be carried out or not so as to prevent an excessive quantity of slippage from taking place. When the slip control switch 30 is depressed, the LED 30a is illuminated. The slip control mode selection switches 31 and 32 are provided in the form of a soil nature mode switch, respectively, which allows an operator to arbitrarily select one of soil nature modes 1 to 5 corresponding to operative conditions (environmental conditions) of the bulldozer, i.e., the present nature of soil. When one of the slip control mode selection switches 31 and 32 is selectively depressed, one LED corresponding to the selected soil nature mode is illuminated.

A plurality of outputs from the engine speed sensor 24, the torque converter output rotation sensor 25, the speed stage detecting sensor 26, the working unit lever detecting sensor 17, the acceleration sensor 27 and the operation monitor panel are inputted into the CPU 90.

The CPU 90 includes an operative condition setting section 40 which selects one of the hard or soft mode for a dozing operation, the soil nature modes 1 to 5 for a ripping operation and a mode having no shoe slip control carried out for the apparatus, based on input conditions for the operation monitor panel 28 shown in FIG. 3. The selected mode signal M is inputted into an engine output controlling section 50.

The CPU 90 derives a tractive power F in a tractive force calculating section 41 based on the detected engine speed Ne and torque converter output shaft rotation speed $N_T$. Specifically, as shown in FIG. 4, first, the CPU 90 calculates an e value in accordance with the following equation, based on the torque converter output shaft rotation speed $N_T$ detected by the torque converter output shaft rotation speed sensor 25 and the engine speed Ne detected by the engine speed sensor 24

$$e = N_T/Ne \quad (1)$$

Figure 4:
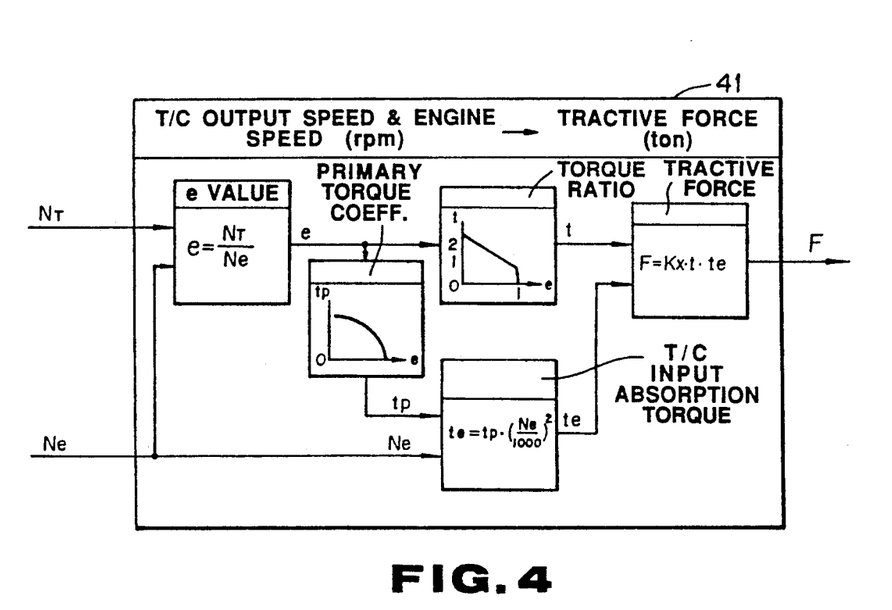
FIG. 4 is a block diagram which schematically illustrates inner structure of a tractive power calculating section in the apparatus.

Next, the CPU 90 derives a primary coefficient $t_p$ from the graphic relationship shown in FIG. 4, based on the e value which has been derived in accordance with the equation (1).

Next, the CPU 90 derives a torque converter input shaft absorption torque $t_e$ in accordance with the following equation (2), based on the thus derived primary torque $t_p$ and the engine speed $N_e$ detected by the engine speed sensor 24.

$$t_e = t_p \times (Ne/1000)^2 \quad (3)$$

In addition, the CPU 90 derives a torque ratio t from the graphic relationship shown in FIG. 4, based on the e value which has been derived from the equation (1). The CPU 90 calculates the tractive power F in the following manner, based on the thus derived ratio t, the torque converter input shaft absorption torque $t_e$ derived in accordance with the equation (2) and a predetermined coefficient $K_x$.

$$F = K_x \cdot t \cdot t_e \quad (3)$$

Incidentally, the present invention may be carried out for deriving the tractive force F based on a torque inputted into the speed changing unit 19, a total speed reduction ratio derived within the range from an input shaft of the speed changing unit 19 to the sprocket 23 and a power transmission efficiency. Alternatively, the present invention may be carried out for directly detecting the tractive force F using a torque sensor or the like means.

Next, the CPU 90 calculates an ideal vehicle speed $v_T$ for the crawler belts 2 in an ideal vehicle speed calculating section 42, based on the torque converter output shaft rotation speed $N_T$, the speed stage signal TM detected by the speed stage detecting sensor 26 and the total speed reduction ratio derived within the range from the speed changing unit 19 to the sprockets 23. Here, the ideal vehicle speed $v_T$ designates a vehicle speed without any occurrence of slippage represented by zero slip, i.e., a crawler belt speed. It should be added that the present invention may be carried out for deriving the ideal vehicle speed $v_T$ by directly detecting the number of rotations of the sprockets 23.

Next, the CPU 90 derives an actual vehicle speed v in an actual vehicle speed calculating section 43 by integrating the acceleration $\alpha$ which has been derived by the longitudinal acceleration sensor 27. It should be noted that since the acceleration of the vehicle body 1 is a composite acceleration consisting of an acceleration represented by $\alpha = d\sigma/dt$ based on the actual vehicle speed v, an acceleration attributable to inclination of the vehicle body (ground surface) and an acceleration attributable to vibration of the vehicle body, the CPU 90 performs a corrective calculation for deriving the acceleration $\alpha$ based only on the actual vehicle speed v by practically subtracting the acceleration attributable to inclination of the vehicle body and vibration of the vehicle body from the actually detected acceleration. Further, it should be noted that the vehicle speed v may not be detected by integrating the acceleration but may directly be detected using predetermined sensors, e.g., a Doppler sensor or the like means.

Next, the CPU 90 calculates a slip rate SP in a slip rate calculating section 48 in accordance with the following equation, based on the actual vehicle speed v calculated in the actual vehicle speed calculating section 43 and the ideal vehicle speed $v_T$ calculated in the ideal vehicle speed calculating section 42.

$$SP = 1 - v/v_T$$

The CPU 90 detects a state of starting movement of the vehicle in a starting movement detecting section 44 based on an output from the acceleration sensor 27. Specifically, the CPU 90 determines that the vehicle starts its movement when the acceleration $\alpha$ exceeds a preset value and then inputs the resultant starting movement detection signal ST into the engine output controlling section 50.

Next, the CPU 90 detects in a neutral detecting section 45 that the transmission is held in a neutral state in response to the speed stage signal TM and then outputs the resultant detection signal N to the engine output controlling section 50.

Further, the CPU 90 detects in a three-point grounding detecting section 46 based on the output $\alpha$ from the acceleration sensor 27 that the vehicle is brought in a three-point grounding state wherein the vehicle body 1 comes in contact with the ground at three points, i.e., the ripper and the both caterpillars and then outputs the resultant detection signal TS to the engine output controlling section 50.

Figure 5:
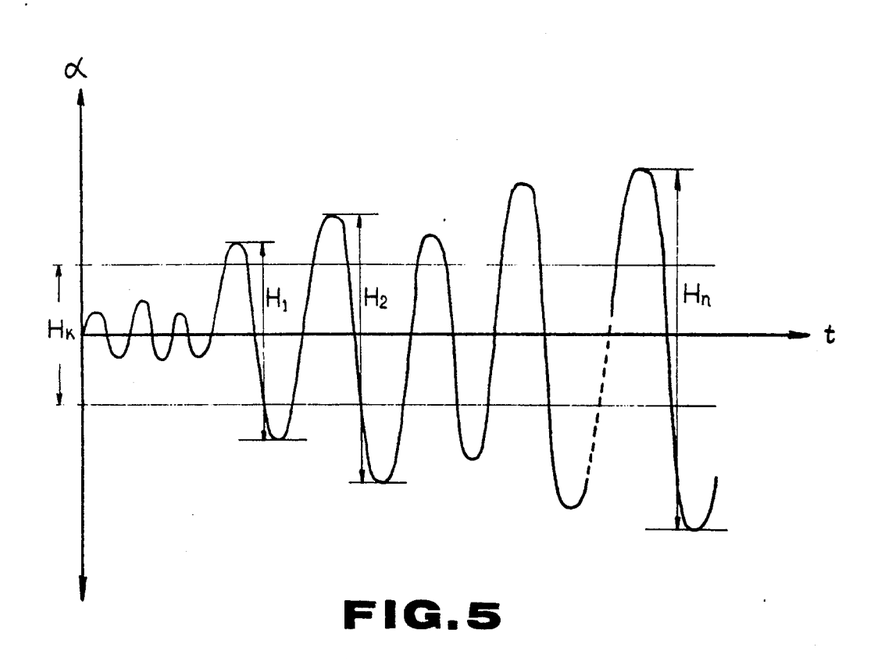
FIG. 5 is a time chart which illustrates by way of example accelerated vibration at the time when the vehicle is held in a three-point grounding state.

Specifically, as shown in FIG. 5, when the vehicle body 1 is brought in the three-point grounding state, it vibrates with the longitudinal acceleration $\alpha$ and a series of amplitudes $H_1, H_2, \cdots H_n$ of the vibration rapidly increase compared with a case where it is not held in the three-point grounding state, while continuously maintaining the increasing state. To this end, the CPU 90 detects in the three-point grounding state detecting section 46 that the vehicle body 1 has been brought in the three-point grounding state, when it has been found that the vibration having an amplitude larger than a predetermined amplitude $H_k$ sequentially occurs by a predetermined number of times $n_c$ (a predetermined number of periods represented by, e.g., $n_c = 8$).

Figure 6:
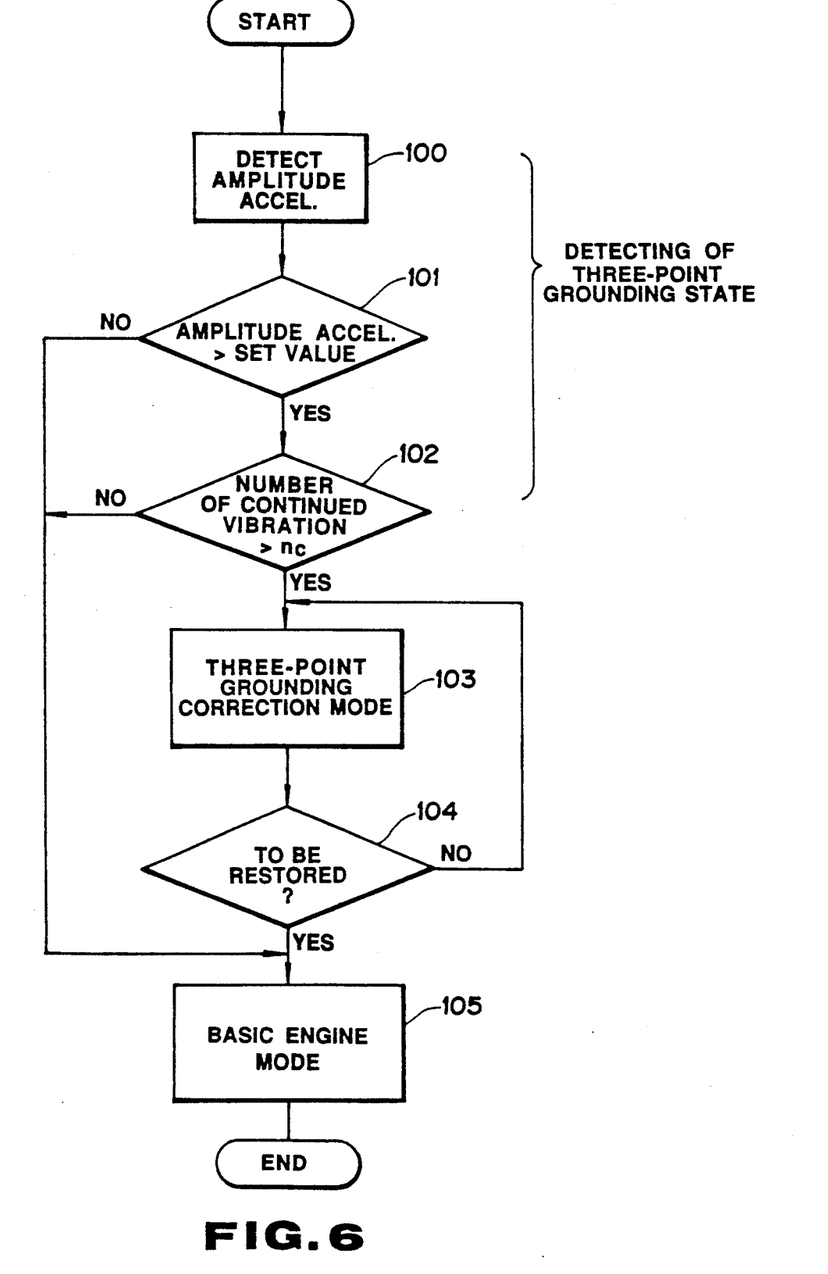
FIG. 6 is a flowchart which illustrates operations to be performed by the apparatus in accordance with a three-point grounding correction mode.

FIG. 6 is a flowchart which schematically illustrates detecting operations to be performed by the CPU 90. The CPU 90 derives in the three-point grounding detection section 46 an amplitude of acceleration from the detected acceleration at all times (step 100) and then compares the thus derived acceleration with a predetermined amplitude H of acceleration (step 101). When the CPU 90 has detected from the above comparison that the amplitude of vibration is larger than a preset value, it examines by how many times of periods the above detection is sequentially carried out (step 102). When it has been found that detection is sequentially carried out in excess of the preset times $n_c$ of periods while an amplitude of the vibration exceeds a preset value, the CPU 90 determines that the vehicle body 1 has been brought in the three-point grounding state. When the CPU 90 detects in the three-point grounding detection section 46 that the vehicle body 1 is held in the three-point grounding state, it outputs the detection signal TS to the engine output controlling section 50. It should be added that a series of processings later than the steps 103 in FIG. 6 will be described later.

Next, the CPU 90 determines an operative state of the respective working units, i.e., the ripper 5 and the blade 3 in a working unit raising/lowering detecting section 47 based on an output from the lever actuation detecting sensor 17 which detects the present operative state of the ripper lever 14 and the blade lever 15 and then outputs the resultant determination result $G_a$ to the engine output controlling section 50.

Figure 7:
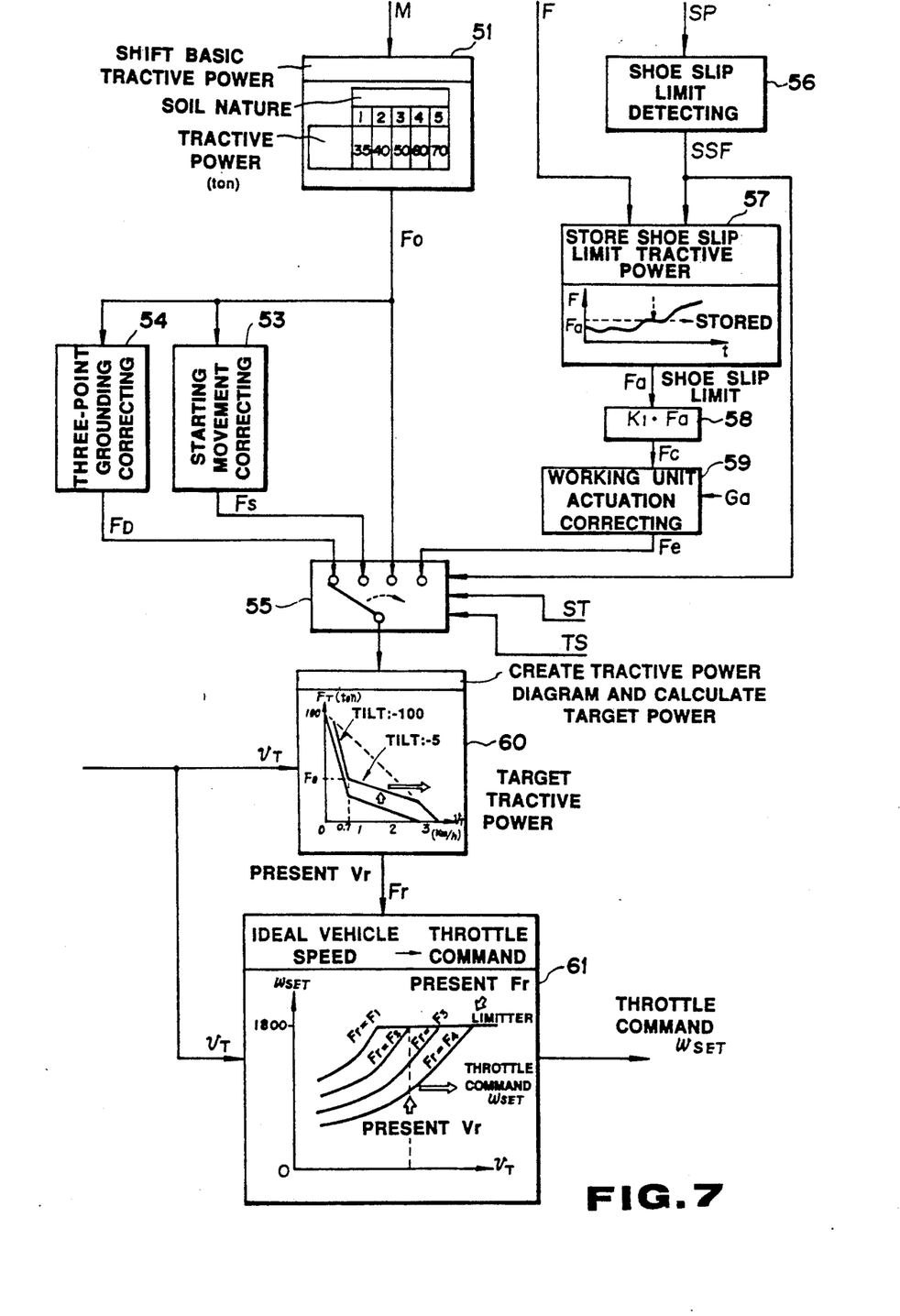
FIG. 7 is a block diagram which schematically illustrates by way of example inner structure of an engine output controlling section in the apparatus.

The engine output controlling section 50 is intended to perform a controlling operation for increasing or decreasing an output from the engine. Inner structure of the engine output controlling section 50 is schematically illustrated in FIG. 7. In this connection, it should be noted that only structure for performing a ripping operation is illustrated in FIG. 7. Further, it should be noted that the engine output controlling section 50 carries out an engine output cut-off control to be described later during the ripping operation which will be performed only at a first speed for forward movement of the bulldozer.

Figure 8:
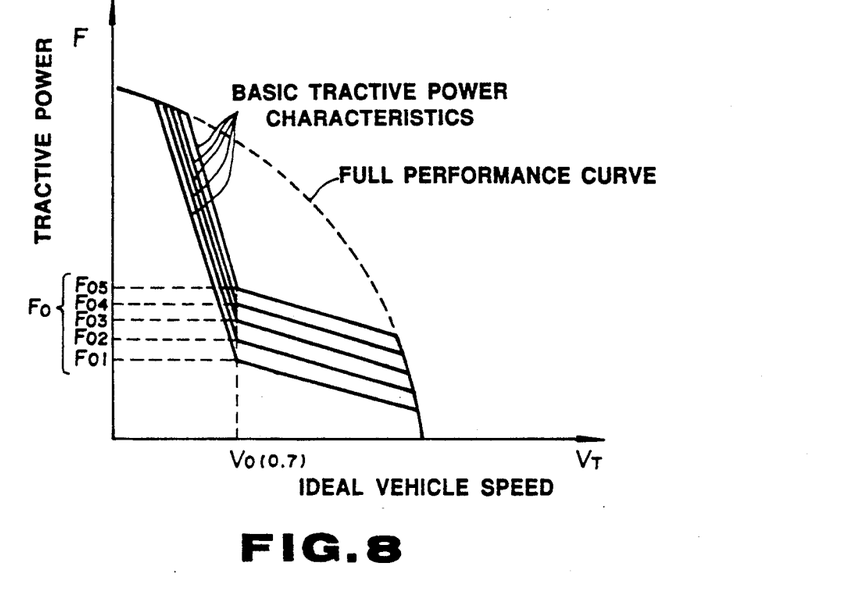
FIG. 8 is a graph which illustrates by way of example basic tractive power characteristics of the apparatus.

The engine output controlling section 50 includes a basic tractive power mode shifting portion 51 in which five basic tractive power characteristics with a high output part (represented by a dotted line in the drawing) in the full performance curve of the engine 10 cut therefrom as shown in FIG. 8 are stored corresponding to a ripping mode. The CPU 90 selects and reads one of the stored five basic tractive power characteristics in response to a mode signal M transmitted from an operative condition setting section 40 and then outputs a tractive power $F_o$ ($F_{o1}$ to $F_{o5}$) on five bent points of the thus read basic tractive power characteristic to subsequent functional parts to be described later. Here, the tractive power $F_o$ on the bent points is hereinafter referred to as a basic tractive power. It should be added that a vehicle speed $V_o$ corresponding to the basic tractive power $F_o$ is set to 0.7 km/hr in the shown case.

Referring to FIG. 7, the CPU 90 determines in a shoe slip limit detecting section 56 whether a shoe slip rate SP transmitted from the shoe slip limit detecting section 56 exceeds a predetermined limit value or not and then outputs a detection signal SSF when it has been found that it exceeds it. In the shown case, the limit value is set to 30%.

The CPU 90 executes a processing of latching a tractive power $F_a$ at the time when the detection signal SSF is inputted into a shoe slip limit power storing portion 57. The latched tractive power $F_a$ is inputted into a slip correcting portion 58 in which the latched tractive power $F_a$ is multiplied with a predetermined correcting coefficient $K_1$ (where $K_1$ is smaller than 1) (see FIG. 9). This correcting coefficient $K_1$ is set to, e.g., 0.5 to 0.8. An output $F_c$ ($=K_1 \cdot F_a$) from the slip correcting portion 58 is inputted into a working unit actuation correcting portion 59 in which the output $F_c$ is adequately corrected in correspondence to actuation of the ripper lever 14. If the bulldozer performs a ripping operation with the tractive force $F_c$ which has been corrected depending on a quantity of slippage, there is a danger that an output from the engine 10 becomes short in power or a working speed becomes slow. For this reason, when the ripper lever 14 is actuated, the corrected tractive power $F_c$ is multiplied with a working unit actuation correcting coefficient $K_L$ (which is larger than 1) to increase an output from the engine 10 (see FIG. 9). This correcting coefficient $K_L$ varies depending on the kind of operation, e.g., lowering of the ripper, tilt-back of the ripper, raising of the ripper, tilt of the ripper or the like. On the other hand, the basic tractive power $F_o$ which has been selected in that way is inputted into a starting movement correcting portion 53 and a three-point grounding correcting portion 54.

Figure 10:
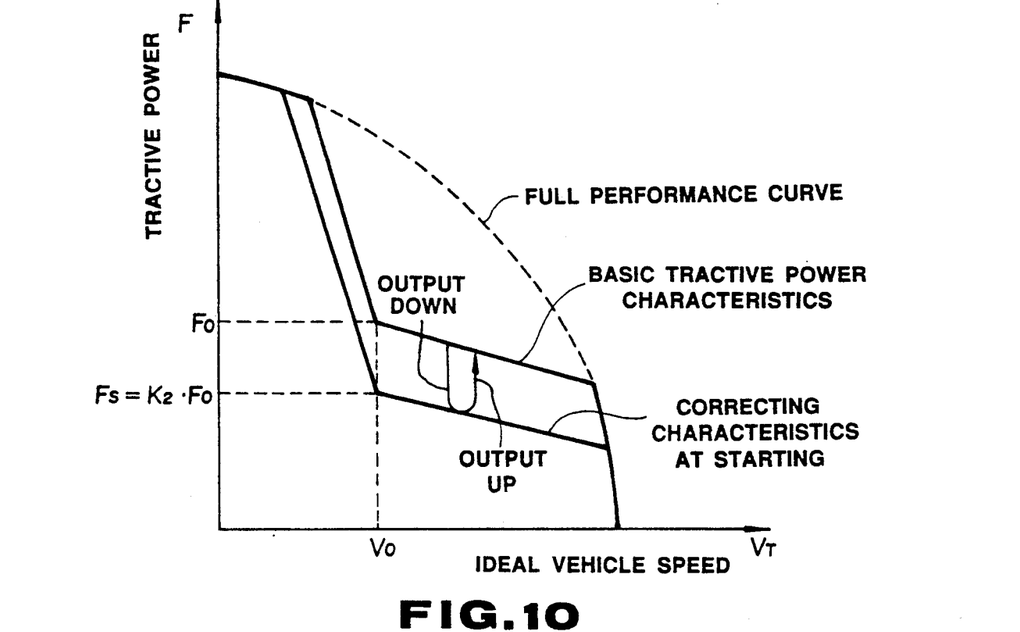
FIG. 10 is a graph which illustrates by way of example tractive power characteristics of the apparatus at the time of starting movement of the vehicle.

The engine output controlling section 50 calculates in the starting movement correcting portion 53 a tractive power $F_s$ which is corrected at the time of starting movement of the bulldozer with a reduced output from the engine 10, by multiplying the inputted basic tractive power $F_o$ with a predetermined correcting coefficient $K_2$ (which is smaller than 1), as shown in FIG. 10. The reduced magnitude of tractive power $F_s$ is gradually increased by a timer circuit 70 (see FIG. 1) so that it is restored to the initial basic tractive power characteristics after a predetermined period of time (e.g., 3 seconds) elapses.

Figure 11:
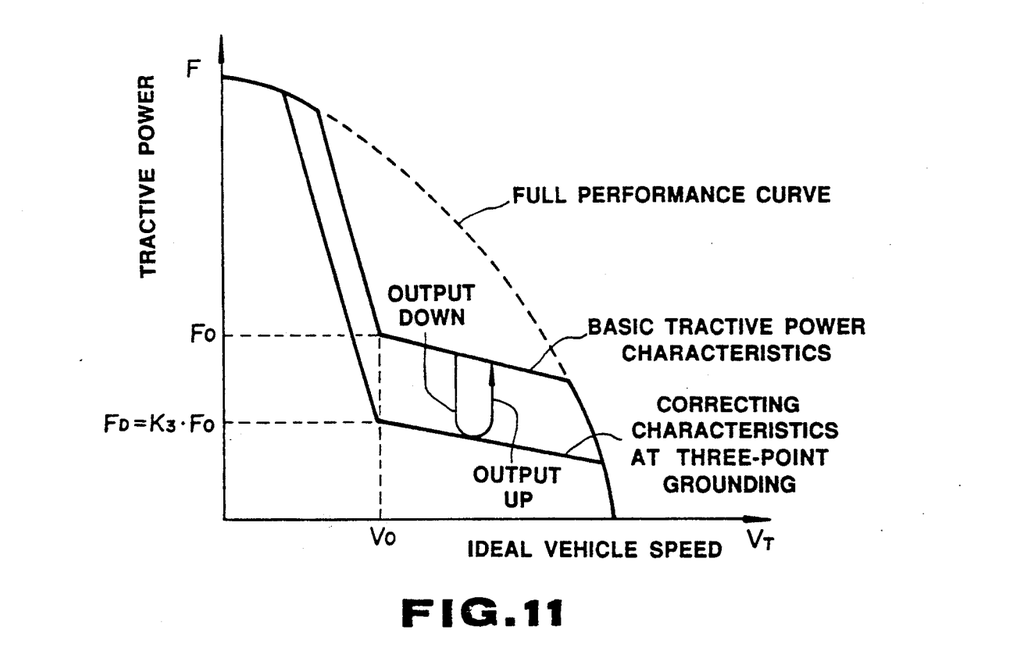
FIG. 11 is a graph which illustrates by way of example tractive power characteristics of the apparatus at the time of three-point grounding.

Further, the engine output controlling section 50 calculates in the three-point grounding correcting portion 54 a tractive power $F_D$ which is corrected at the time of three-point grounding with a reduced output from the engine 10, by multiplying the inputted tractive force $F_o$ with a predetermined correcting coefficient $K_3$ (which is smaller than 1), as shown in FIG. 11.

Next, the engine output controlling section 50 selects in a shifting circuit 55 one of the four tractive forces $F_e$, $F_o$, $F_s$ and $F_D$ depending on the signals SSF, ST and TS and the selected tractive force is then inputted into a target tractive power calculating portion 60. If the shoe slip rate exceeds the limit value (30%) (with the signal SSF set to 1), the tractive power $F_e$ is selected. If the shoe slip rate does not exceed the limit value (with the signal SSF set to 0), the tractive power $F_o$ is selected. In addition, at the time of starting movement of the bulldozer (with the signal ST set to 1), the tractive force $F_s$ is selected. Further, at the time of three-point grounding (with the signal TS set to 1), the tractive power $F_D$ is selected.

Tilt of the respective tractive power characteristics is preset in a target tractive force calculating portion 60 so that the target tractive power calculating portion 60 generates tractive power characteristics which are corrected by using the preset tilt of the tractive power characteristics with the tractive power $F_c$, $F_o$, $F_s$ or $F_D$ inputted from the shifting circuit 55 as bent points of the tractive power characteristics and moreover the target tractive power calculating portion 60 derives a target tractive power $F_r$ corresponding to the present ideal vehicle speed $v_T$, based on the corrected tractive power characteristics.

This tractive power $F_r$ is inputted into a throttle command generating portion 61 to derive from the inputted tractive power $F_r$ a throttle command $\omega$ SET corresponding to the present crawler belt speed $v_T$, i.e., a target engine speed of the engine 10.

The throttle command $\omega_{SET}$ which has been derived in that way is inputted into a minimum value selecting section 71 shown in FIG. 1. In addition to the throttle command $\omega_{SET}$, an output from the throttle lever 9 and an output from the deceleration pedal 13 are inputted into the minimum value selecting section 71 so that the minimum value selecting section 71 selects a smaller command value of the foregoing outputs. For example, if an output generated by actuating the throttle lever 9 by an operator or actuating the deceleration pedal 13 by his foot is smaller than the throttle command $\omega_{SET}$, the minimum value selecting section 71 selects a command value given by the operator who actuates the throttle lever 9 or the deceleration pedal 13. Consequently, the apparatus of the present invention assures a high safety of operation and a quick responsiveness to operation of the apparatus in case of an occurrence of emergency.

Figure 12:
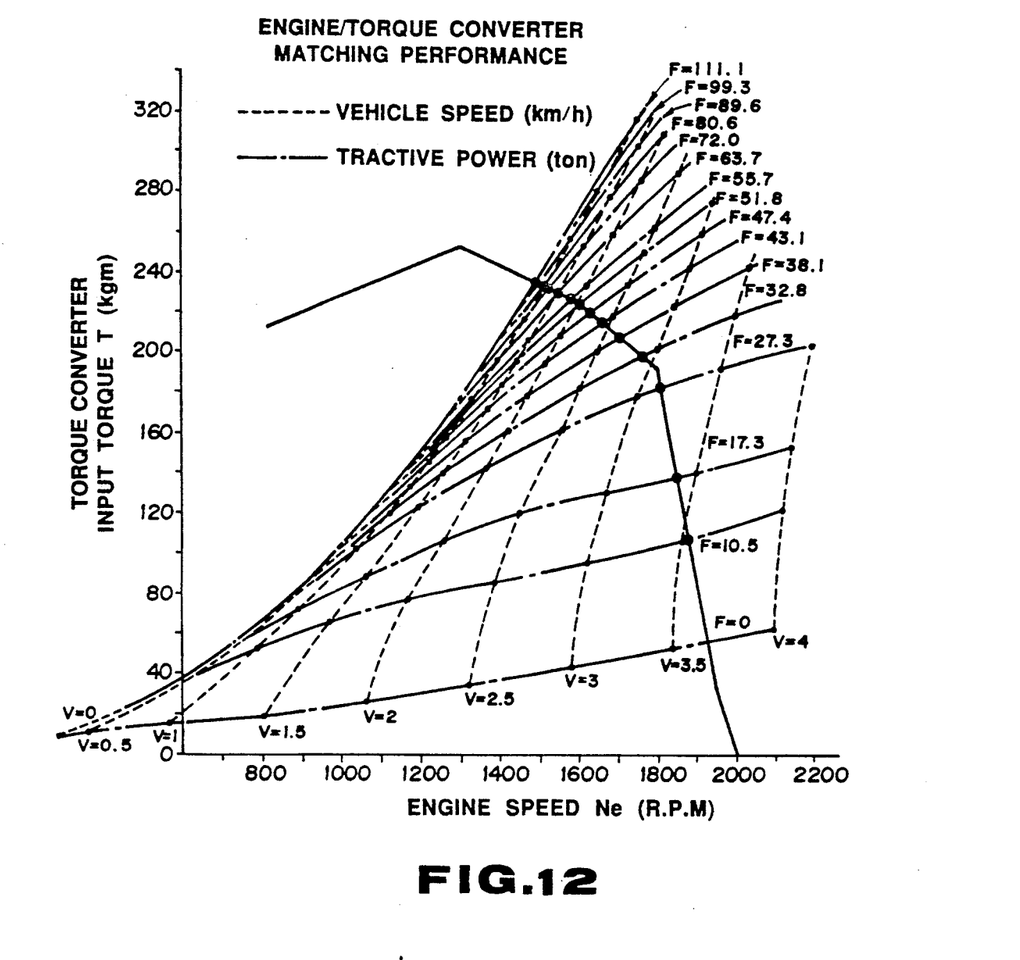
FIG. 12 is a graph which schematically illustrates a relationship between a vehicle speed and a tractive power derived from engine/torque converter matching characteristics of the apparatus.

A quantity of fuel to be injected by the fuel injecting unit is controlled by inputting an output from the minimum value selecting section 71 into the governor 11, whereby an output from the engine 10 is controlled adequately. FIG. 12 is a graph which schematically illustrates a relationship between a vehicle speed and a tractive power which will be derived from an engine/-torque converter matching performance. This relationship is established by deriving from a vehicle speed-tractive power curve a vehicle speed which will become a target relative to a tractive power generated as a load and then setting a target engine speed which will become an engine output in such a manner as to extend through an intersection as defined by the vehicle speed and the tractive power. Then, a quantity of fuel to be injected is controlled via the governor 11 and the fuel injection pump 12 to maintain the thus set engine speed.

Figure 13:
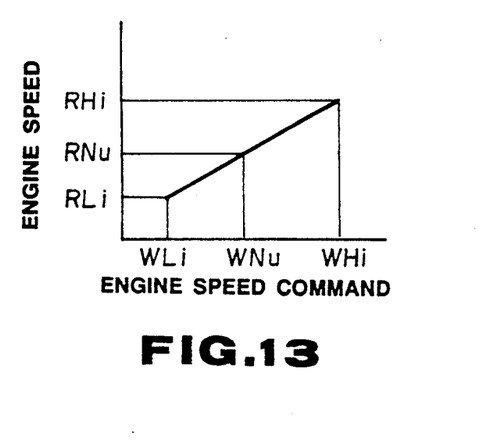
FIG. 13 is a graph which schematically illustrates an engine speed at the time when the vehicle is held in a neutral state.

In this case, when a detection signal N from the neutral detecting section 45 is inputted into the engine output controlling section 50, the engine output controlling section 50 outputs a command $WN_u$ corresponding to a suitable engine speed $RN_u$ between an engine speed $RH_i$ instructed by a high idle engine speed command $WH_i$ and an engine speed $RL_i$ instructed by a low idle engine speed command $WL_i$ to automatically reduce the engine speed during running of the vehicle at a neutral speed down to the suitable engine speed $RN_u$, as shown in FIG. 13. It should be added that the engine speed $RN_u$ can arbitrarily be varied as required.

Figure 14:
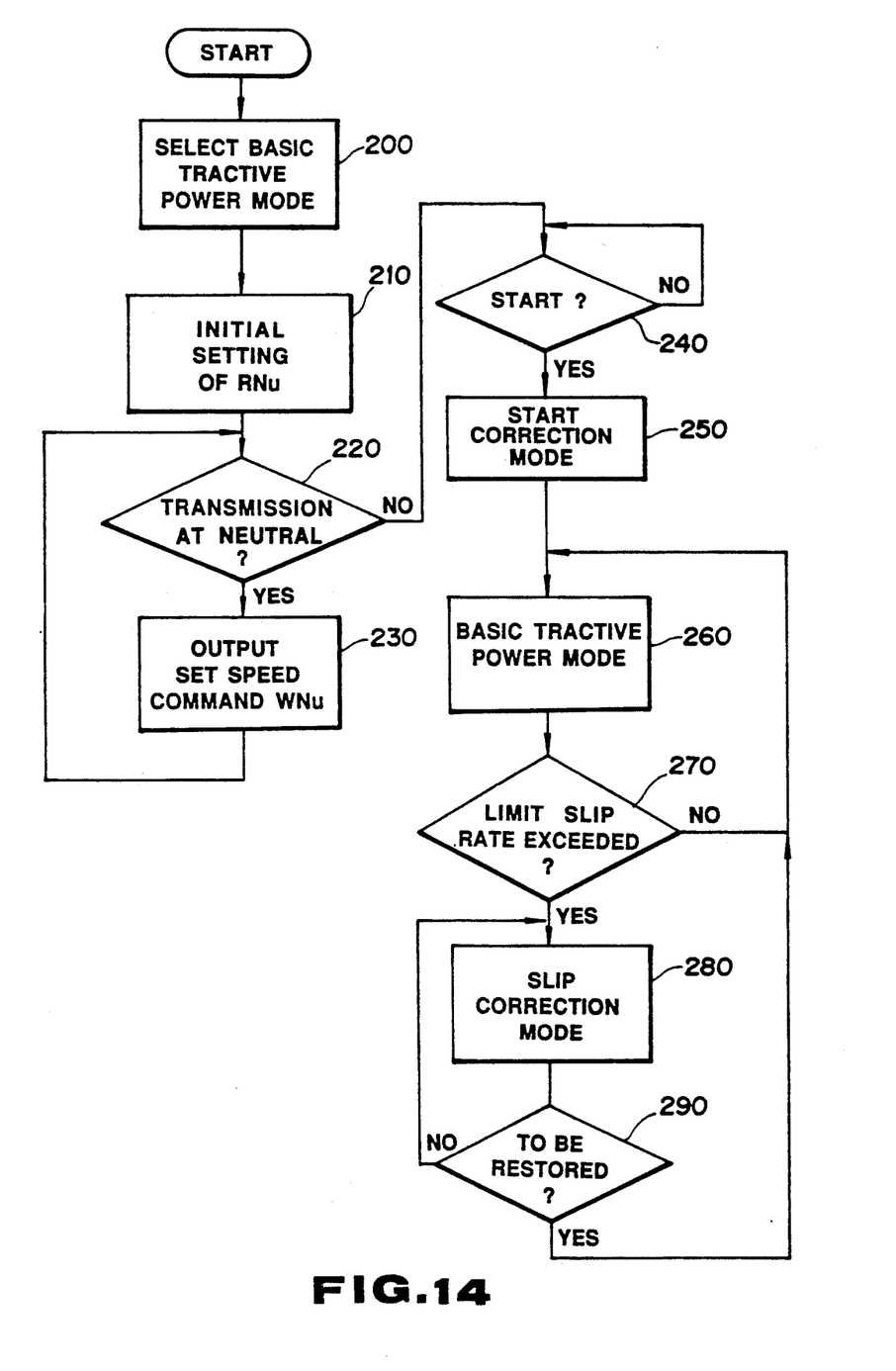
FIG. 14 is a flowchart which schematically illustrates all operations to be performed by the apparatus in accordance with the embodiment of the present invention.
Figure 15:
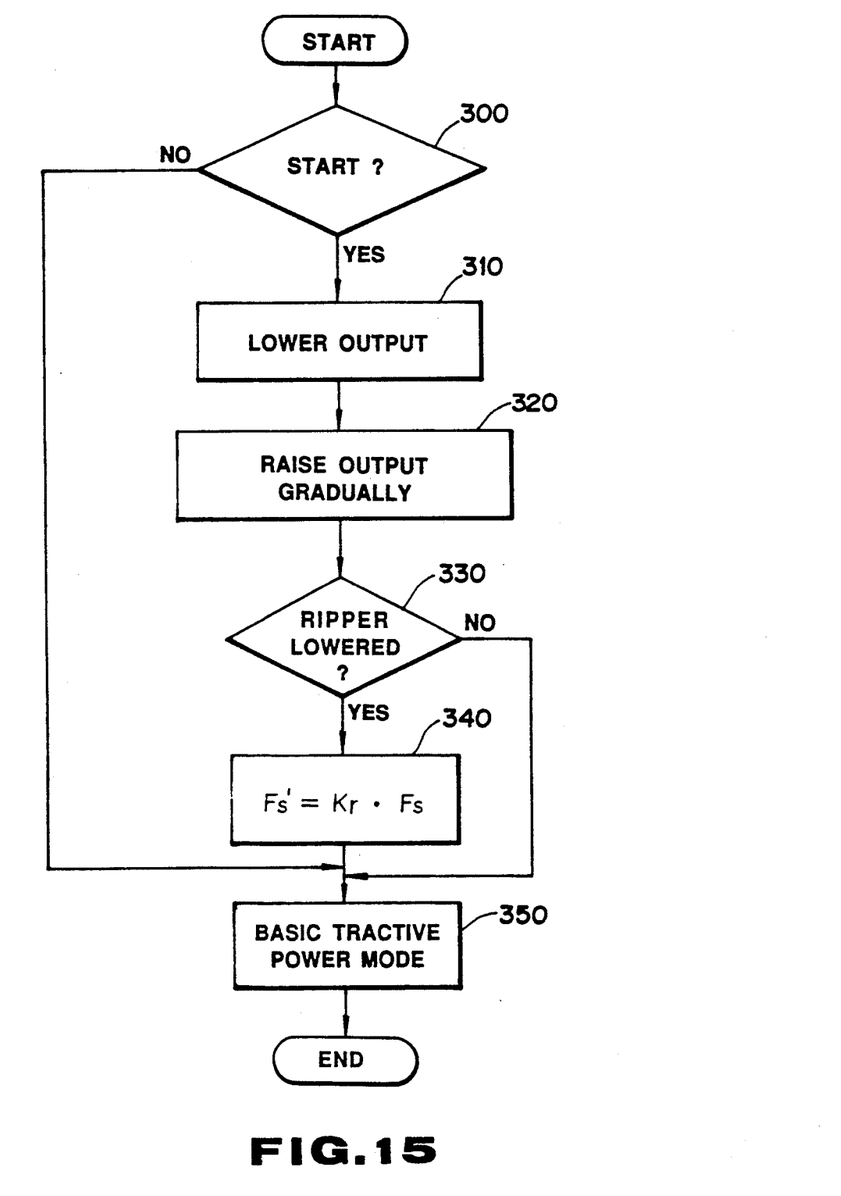
FIG. 15 is a flowchart which schematically illustrates operations to be performed by the apparatus at the time of starting movement of the vehicle.

Next, operations to be performed by the apparatus of the present invention as constructed in the above-described manner will be described below with reference to flowcharts shown in FIGS. 14 and 15. Here, it should be noted that description will be made as to a case where the bulldozer performs a ripping operation.

When the apparatus carries out shoe slip control, i.e, the apparatus performs an operation relevant to structural components 56, 57, 58 and 59 shown in FIG. 7, an operator shifts switches 30 to 32 on the operation monitor panel 28 in FIG. 3 to ON to instruct shoe slip control and suitably select one of soil nature modes 1 to 5. In addition, he performs an initial setting operation for a variety of parameters which are required for carrying out shoe slip control (step 200 in FIG. 14). Then, he sets to a suitable value the engine speed $RN_u$ at the time when the transmission is held in a neutral state (step 210).

When the vehicle starts its running, the engine output controlling section 50 in the CPU 90 performs a searching operation based on the output N from a neutral detecting section 45 as to whether the transmission is held in the neutral state or not (step 220). If the engine output controlling section 50 detects that the transmission is held in the neutral state, it executes a process of reducing the present engine speed down to the engine speed $RN_u$ corresponding to the throttle command $WN_u$ by outputting therefrom the throttle command $WN_u$ which has been set at the step 210 (step 230). Consequently, the engine speed is automatically reduced to a suitable engine speed at the time when the transmission is held in the neutral state, resulting in fuel saving being achieved. Thereafter, even when the vehicle starts its running at a first forward speed, it can adequately perform a ripping operation at a predetermined position without rapid starting movement thereof.

When it has been found that the transmission is held in an operative state other than the neutral state, the engine output controlling section 50 performs a searching operation, based on the output ST from a start detecting section 44, as to whether the vehicle has started its running or not (step 240). If it detects that the vehicle has started its running, it executes a starting movement correction mode shown in FIG. 15.

Namely, when the engine output controlling section 50 detects that the vehicle has started its running (step 300 in FIG. 15), a starting movement correction portion 53 in the engine output controlling section 50 once reduces an output from the engine 10 (step 310). Thereafter, the engine output controlling section 50 gradually raises the reduced engine output up to the original basic tractive power characteristics within a predetermined period of time by using the output from a timer 70 (step 320). Specifically, the engine output controlling section 50 executes a power down/up control by outputting a corrected tractive power $F_s$ therefrom in accordance with the following equation on the assumption that $K_2$ designates a correction coefficient, $T_c$ designates a restoration setting time and T designates a period of time that elapses.

$$Fs = Of((1-k2)T/Tc + K2)$$

According to the above-described embodiment of the present invention, when the bulldozer performs a lowering operation for lowering the ripper while the CPU 90 is carrying out starting movement control, the CPU 90 cancels shortage in engine power by multiplying the output $F_s$ with a correction coefficient $K_r$ (which is larger than 1) (steps 330 and 340). Thereafter, the CPU 90 shifts to a normal basic tractive power mode with which the CPU 90 is to carry out control.

Figure 9:
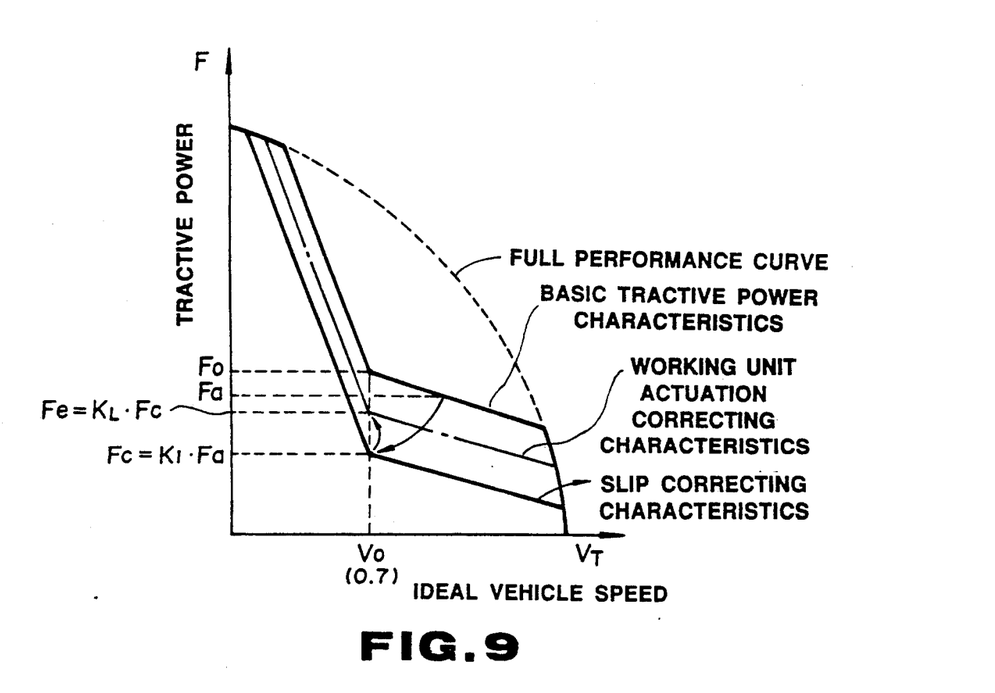
FIG. 9 is a graph which illustrates by way of example tractive power characteristics of the apparatus having slip correction added thereto.

Then, a tractive power $F_o$ corresponding to the soil mode selected by the shifting circuit 55 in FIG. 7 is inputted into the CPU 90 while the basic tractive power mode is maintained so that the engine output is controlled with any one of the five tractive power characteristics shown in FIG. 8. While the basic tractive power mode is maintained, the CPU 90 executes examination as to whether or not the shoe slip rate exceeds a limit shoe slip rate (e.g., 30 %) in response to the output SSF from a shoe slip limit detecting portion 56 (step 270). When it has been found that it exceeds the limit shoe slip rate, the CPU 90 shifts to a slip correction mode as shown in FIG. 9 (step 280).

While the slip correction mode is maintained, the CPU 90 reduces an output from the engine 10 further so that the tractive power $F_a$ at the time when the shoe slip rate exceeds the limit value as described above is reduced further to the tractive power $F_c$.

The shoe slip correction mode is gradually restored to the original basic tractive power mode, if conditions, e.g., a condition wherein the shoe slip rate is less than 20%, a condition wherein the vehicle speed exceeds a predetermined value, a condition wherein the tractive power becomes smaller than a predetermined value and so forth are established (step 290).

It should be noted that the basic tractive power characteristics shown in FIG. 8 are set as curves which enable the vehicle to move forwardly at a highest speed with a maximum effective tractive power. However, when the CPU 90 determines that the bulldozer is practically held in a slippage state, it can be concluded that the tractive power $F_a$ derived at that time represents a maximum effective tractive power. In view of the aforementioned fact, the CPU 90 reduces the vehicle speed by performing a correcting operation to reduce the basic tractive power $F_o$ down to $K_2 \cdot F_a$, whereby an occurrence of slippage is diminished. As a result, the bulldozer moves at a reduced speed while generating a maximum effective tractive power which is most suitable for a working site where slippage practically occurs and moreover most suitable for the current ripping operation, whereby an occurrence of slippage can be minimized.

When slippage in excess of the limit value does not occur, the CPU 90 cuts off a high output part in the engine output and operates the bulldozer with basic tractive power characteristics corresponding to the present soil nature. Thus, the bulldozer can exhibit a maximum effective tractive power most suitable for the working site where no slippage occurs. If the CPU 90 increases or decreases the engine output depending on the operative state of the ripper at the time when the basic tractive power mode is maintained, the bulldozer can generate a maximum effective tractive power most suitable for the present operative state of the ripper at the time when the basic tractive power mode is maintained.

Further, if the CPU 90 gradually shifts the engine output from the basic tractive power mode to the slip correction mode and vice versa within a predetermined period of time, e.g., 0 to 3 seconds after the aforementioned restoration conditions have been established, the bulldozer can operate smoothly without any occurrence of shock.

The three-point grounding detecting section 46 detects during the above-described engine control, based on the vibratory state of the acceleration of the vehicle, whether the three-point grounding state is reached or not (steps 100 to 102 in FIG. 6). When a detection signal TS is inputted into the engine output control section 50 from the three-point grounding detecting section 46, the engine output control section 50 executes a three-point grounding correction mode as shown in FIG. 11. Specifically, the CPU 90 calculates the corrected tractive power $F_D$ at the time of three-point grounding in a three-point grounding correcting portion 53 by multiplying the tractive power $F_o$ having the presently selected basic tractive power characteristics with a predetermined correction coefficient $K_3$ and moreover the CPU 90 controls the engine output so as to allow the vehicle to move with the tractive power characteristics including the tractive power $F_D$ as a bent point (step 103).

In this manner, at the time of three-point grounding, the engine output is automatically reduced to an adequate engine output which assures that the three-point grounding state can be avoided.

Such engine output correction derived from the three-point grounding state is canceled when the following conditions are established. Thereafter, a controlling operation is gradually restored to the original basic tractive power mode (steps 104 and 105).

Conditions:

The slip rate is smaller than a set value.
The tractive force is smaller than a set value.
The vehicle speed is larger than a set value.

In this manner, while the three-point grounding state is maintained, the engine output is automatically reduced and thereby an operator is not required to depress the deceleration pedal.

It should be noted that the CPU 90 executes engine control based on the basic tractive power characteristics shown in FIG. 8 as well as engine control based on the slip correction shown in FIG. 9, when a shoe slip control switch 30 in FIG. 3 is shifted to ON. However, if the shoe switch control switch 30 is not shifted to ON, the CPU 90 does not perform the aforementioned controlling operation but it executes control in accordance with the full performance curve in the same manner as in normal cases.

In a case where the bulldozer is instructed to perform a bulldozing operation, the CPU 90 selects from a memory in the engine output controlling section 50 characteristics similar to those in FIG. 8 including a series of bent points, reads them and then executes control similar to the aforementioned ones.

According to the above-described embodiment of the present invention, the correction coefficient $K_1$ at the time of an occurrence of shoe slip is set common to each nature of soil, as shown in FIG. 9. However, the present invention should not be limited only to this. Alternatively, a different correction coefficient $K_1$ may be set depending on one of the soil natures 1 to 5.

Further, according to the above-described embodiment of the present invention, a signal representative of the present vehicle speed stage is detected by a clutch hydraulic pressure sensor in the transmission. Alternatively, the vehicle speed stage may be detected by detecting the position which has been assumed by the shift lever. In addition, the tractive power, the ideal vehicle speed, the actual vehicle speed, the state of starting movement of the vehicle, the state of three-point grounding and so forth may be detected by employing an arbitrary detecting method other than the method which has been employed for carrying out the embodiment of the present invention.

Additionally, according to the above-described embodiment of the present invention, when the three-point grounding state is detected, the CPU 90 reduces the engine output by multiplying the tractive power $F_o$ derived from the basic tractive power characteristics with a correction coefficient $K_3$. Alternatively, the CPU 90 may reduce the engine output by multiplying the tractive power at the bent point on the curve representative of the slip correction mode with a predetermined correction coefficient, when the vehicle operates in accordance with the slip correction mode at the time of detection of the three-point grounding state.

Moreover, with respect to power-down control to be carried out at the time of starting movement of the vehicle, the CPU 90 may take a logic sum consisting of detection output in the state of starting movement of the vehicle and detection output at the time of lowering of the ripper to carry out power-down control based on the output derived from the logic sum. In this case, the apparatus of the present invention prevents a vehicle speed from being excessively increased during a ripping operation which is performed at the same time when the vehicle starts its movement. Consequently, the ripping operation can be accomplished with good results.

INDUSTRIAL APPLICABILITY

The present invention is advantageously applicable for the purpose of controlling, an engine during a ripping operation, a bulldozing operation or the like operation with the use of a crawler type tractor, e.g., bulldozer or the like vehicle.

We claim:

1. An apparatus for controlling output from an engine installed on a crawler type vehicle provided with a ripper shank, wherein said vehicle runs by means of left and right crawler belts to which output of the engine is transmitted via a torque converter, a transmission, a driving shaft, comprising:

tractive power characteristic outputting means for outputting a basic tractive power characteristic having a characteristic of decreasing a tractive power of the vehicle as an ideal vehicle speed increases with a first gradient within a range where the ideal vehicle speed is lower than a predetermined speed and a characteristic of decreasing the tractive power as the ideal vehicle speed increases with a second gradient smaller than the first gradient within a range where the ideal vehicle speed is larger than the predetermined speed and for outputting a starting tractive power characteristic in which the output of the engine is lowered by a predetermined value from the output of the engine in the basic tractive power characteristic;

starting movement detecting means for detecting starting movement of the vehicle;

means for selecting the starting tractive power characteristic and reducing the output of the engine when starting movement of the vehicle is detected by the starting movement detecting means;

means for gradually raising the output of the engine from the starting tractive power characteristic to the basic tractive power characteristic within a preset period of time after the output of the engine is reduced;

ripper operation detecting means for detecting the lowering operation of the ripper shank; and means for raising the output of the engine by outputting a modified tractive power characteristic in which the starting tractive power characteristic is raised by a preset value when the lowering operation of the ripper shank is detected by the ripper operation detecting means.

2. The apparatus of claim 1, further comprising:

shoe slip detecting means for detecting when a shoe slip rate exceed a predetermined limit slip rate; and means for receiving a tractive power value at the time when the shoe slip detecting means detects that the limit slip rate is exceeded and for outputting a shoe slip modifying tractive power characteristic for modifying shoe slip so as to cut off the output of the engine.

3. The apparatus of claim 1, wherein the tractive power characteristic outputting means is provided with a plurality of different basic tractive power characteristics for a ripping operating corresponding to hardness of soils to which the ripping operation is performed, and the apparatus further comprises means for selectively designating one of the plurality of basic tractive power characteristics.

* * * * *